(12) United States Patent
Lee

(10) Patent No.: US 7,760,818 B2
(45) Date of Patent: Jul. 20, 2010

(54) DATA MODULATOR BASED ON GAUSSIAN MINIMUM SHIFT KEYING (GMSK) MODULATION AND DATA TRANSMITTER INCLUDING THE SAME

(75) Inventor: Dong-Won Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 676 days.

(21) Appl. No.: 11/687,699

(22) Filed: Mar. 19, 2007

(65) Prior Publication Data

US 2008/0013643 A1    Jan. 17, 2008

(30) Foreign Application Priority Data

Jul. 14, 2006   (KR) .................... 10-2006-0066218

(51) Int. Cl.
*H03C 3/00* (2006.01)
(52) U.S. Cl. .................. 375/305; 375/274; 375/336
(58) Field of Classification Search ............. 375/305, 375/274, 336
See application file for complete search history.

(56) References Cited

U.S. PATENT DOCUMENTS

| | | | | |
|---|---|---|---|---|
| 5,022,054 A | * | 6/1991 | Wang | 375/305 |
| 5,942,955 A | * | 8/1999 | Matui | 332/101 |
| 5,956,328 A | * | 9/1999 | Sato | 370/335 |
| 6,320,914 B1 | * | 11/2001 | Dent | 375/302 |
| 6,771,711 B2 | * | 8/2004 | Kranz et al. | 375/305 |

FOREIGN PATENT DOCUMENTS

| KR | 102001009465 A | 11/2001 |
|---|---|---|
| KR | 1020020040048 A | 5/2002 |

OTHER PUBLICATIONS

Hatamoto, "Efficient filter design for the global standardized GSM wireless system", 1995 Conference Record of the Twenty-Ninth Asilomar Conference on Signals, Systems and Computers, 1995, vol. 1, Oct. 30-Nov. 2, 1995 pp. 300-304 vol. 1.*

* cited by examiner

*Primary Examiner*—Juan A Torres
(74) *Attorney, Agent, or Firm*—F. Chau & Associates, LLC

(57) ABSTRACT

A data modular based on Gaussian minimum shift keying (GMSK) modulation and a data transmitter including the same in which the data modulator includes a read-only memory (ROM) table storing GMSK modulation data with respect to information bits; a low-pass filter filtering first GMSK modulation data, which is output from the ROM table based on a predetermined input bitstream, and outputting second GMSK modulation data; and a multiplexer selecting and outputting the first GMSK modulation data or the second GMSK modulation data based on a predetermined control signal. The data modulator selectively filters a GMSK modulation signal according to a channel state, thereby effectively controlling trade-off between inter-symbol interference and adjacent channel interference according the channel state.

11 Claims, 6 Drawing Sheets

DATA MODULATOR BASED ON GAUSSIAN MINIMUM SHIFT KEYING (GMSK) MODULATION AND DATA TRANSMITTER INCLUDING THE SAME

BACKGROUND OF THE INVENTION

This application claims the priority of Korean Patent Application No. 2006-0066218, filed on Jul. 14, 2006, in the Korean Intellectual Property Office, the disclosure of which is incorporated herein in its entirety by reference.

1. Technical Field

The present disclosure relates to a data modulator, and more particularly, to a data modulator based on Gaussian minimum shift keying (GMSK) modulation and a data transmitter including the same.

2. Discussion of Related Art

GMSK is a kind of minimum shift keying (MSK) and is a modulation scheme by which rapid change in binary data is removed by smoothing phase changes using a Gaussian pulse shaping filter, so that the bandwidth of the modulated signal is reduced.

FIG. 1 illustrates the impulse response of a Gaussian pulse shaping filter with respect to bandwidth (BT). Referring to FIG. 1, the impulse response of the Gaussian pulse shaping filter that exists in a range from $t=-\infty$ $t=+\infty$ causes inter-symbol interference (ISI). When BT decrease, symbol energy a $\alpha$, that is, the power corresponding to $\alpha$, increases and, thus, ISI also increases.

FIG. 2 illustrates the power spectral density (PSD) of MSK and GMSK. Referring to FIG. 2, the power spectral density (PSD) of GMSK has lower side-lobe power and narrower main-lobe width than that of MSK. When filtering is performed using a baseband Gaussian filter before MSK modulation, side-lobe power and main-lobe width can be reduced. In this case, the slope of the main lobe increases more and the level of the side lobe decreases more. This kind of MSK modulation with Gaussian filtering of a baseband signal is referred to as GMSK modulation.

In GMSK modulation, a main-lobe width and a side-lobe level are determined by BT. BT is a standardized bandwidth and is obtained by multiplying a 3-dB bandwidth B of a Gaussian filter by a symbol interval T. When the BT is decreased, the main-lobe width and the side-lobe level are also decreased. Accordingly, when the BT is small, the adjacent channel interference (ACI) is also small.

Referring to FIGS. 1 and 2, ISI and ACI are in a trade-off relation.

GMSK is usually used in communication systems in which a narrow band width is allocated to a single user. A global system for mobile communication (GSM) is one of these communication systems. The GSM uses GMSK modulation in which BT is 0.3. This means that the 3-dB bandwidth of a Gaussian filter used for GMSK modulation is 0.3*271 kHz. The value of BT is obtained by performing a trade-off analysis of ISI and ACI and selecting a value giving optimal performance.

FIG. 3 is a block diagram of a conventional data modulator 300 based on GMSK modulation. Referring to FIG. 3, the data modulator 300 includes a GMSK modulator 310, digital-to-analog converters 320 and 325, and low-pass filters 330 and 335. The GMSK modulator 310 includes a shift register 311, a counter 312, an I-channel read-only memory (ROM) table shown at 313, a Q-channel ROM table shown at 314, and latches 315 and 316.

In GMSK modulation, input digital information is Gaussian filtered bit by bit integrated value are output as I-channel data and Q-channel data, respectively. When this operation is actually performed in hardware, however, computation is very complicated and power efficiency is not good. For this reason, the GMSK modulator 310 usually has the I-channel ROM table 313, in which results of performing GMSK modulation on an I-channel are stored in advance, and the Q-channel ROM table 314, in which results of performing GMSK modulation on a Q-channel are also stored in advance.

The impulse response of a Gaussian pulse shaping filter used in GMSK exists in a range from $t=-\infty$ to $t=+\infty$, but when |t| increases from a reference point, $t=0$, the impulse response becomes so small as to be negligible. Accordingly, when a GMSK modulator is implemented in the form of a look-up table, it is assumed that the magnitude of an impulse response is 0 when $|t|>nT$ where "n" is a real number. For example, when n=1.5, a GMSK modulation value for a current bit is calculated considering both a previous bit and a subsequent bit of the current bit.

The shift register 311 shifts an input digital information signal Inf, which is input in a bitstream, by one bit and outputs a data signal corresponding to the number of bits, which should be considered, for example, 3 bits when n=1.5, in parallel. The I-channel ROM table 313 and the Q-channel ROM table 314 output GMSK modulation values corresponding to the data signal received from the shift register 311. Since a single GMSK modulation value includes a plurality of samples, the counter 312 outputs a count signal for sequentially outputting the plurality of samples to the I-channel ROM table 313 and the Q-channel ROM table 314. The latch 315 latches the GMSK modulation signal output from the I-channel ROM table 313 and the latch 316 latches the GMSK modulation signal output from the Q-channel ROM table 314.

Each of the latched GMSK modulation signals is converted into an analog signal by one of the digital-to-analog converters 320 and 325, processed by on of the low-pass filters 330 and 335, and transmitted to an I-channel or a Q-channel, respectively.

GMSK modulation values stored in the I-channel ROM table 313 and those stored in the Q-channel ROM table 314 are calculated based on a fixed BT value, for example, BT=0.3, for GMSK modulation in a GSM. Even if an optimal BT value is selected considering ISI and ACI, the channel state may vary according to the external environment and, therefore, a method of adaptively controlling ISI and ACI according to the channel state is desired.

SUMMARY OF THE INVENTION

Exemplary embodiments of the present invention provide a data modulator for adaptively controlling inter-symbol interference (ISI) and adjacent channel interference (ACI) according to a channel state based on Gaussian minimum shift keying (GMSK) modulation, and a data transmitter including the data modulator is provided as well.

According to an exemplary embodiment of the present invention, there is provided a data modulator including a shift register shifting a digital information signal, which is input in a bitstream, and outputting a first data signal, which is one of N-bit data signals; a read-only memory (ROM) table storing GMSK modulation signals respectively corresponding to the N-bit data signals and outputting a first GMSK modulation signal, which is one GMSK modulation signal corresponding to the first data signal among the stored GMSK modulation signals; and a low-pass filter for filtering the first GMSK modulation signal and outputting a second GMSK modulation signal.

The data modulator may further include a multiplexer selecting and outputting one signal among the first GMSK modulation signal and the second GMSK modulation signal based on a predetermined control signal.

The data modulator may further include a counter outputting a count signal for sequentially outputting M samples in the first GMSK modulation signal corresponding to the first data signal, wherein each of the GMSK modulation signals includes M samples.

The predetermined control signal my be determined based on channel state information including ACI and ISI, which is obtained from a receiver.

According to an exemplary embodiment of the present invention, there is provided a method of modulating data based on a read-only memory (ROM) table that stores Gaussian minimum shift keying (GMSK) modulation signals respectively corresponding to N-bit data signals. The method includes shifting a digital information signal, which is input in a bitstream, and outputting a first data signal, which is one of the N-bit data signals; outputting a first GMSK modulation signal, which is one GMSK modulation signal corresponding to the first data signal among the stored GMSK modulation signals, from the ROM table, and filtering the first GMSK modulation signal to output a second GMSK modulation signal.

According to an exemplary embodiment of the present invention, there is provided a data transmitter including a data encoder encoding an analog information signal into a digital information signal; a data modulator modulating the digital information signal into a first Gaussian minimum shift keying (GMSK) modulation signal and selecting and outputting one modulation signal among the first GMSK signal and a second GMSK signal, which is obtained by filtering the first GMSK modulation signal, based on a predetermined control signal including channel state information received from a receiver; and a digital-to-analog converter converting a modulation signal output from the data modulator into an analog signal.

BRIEF DESCRIPTION OF THE DRAWINGS

Exemplary embodiments of the present invention will be understood in more detail from the following descriptions taken in conjunction with the attached drawings in which.

DETAILED DESCRIPTION OF EXEMPLARY EMBODIMENTS

Figure 1:
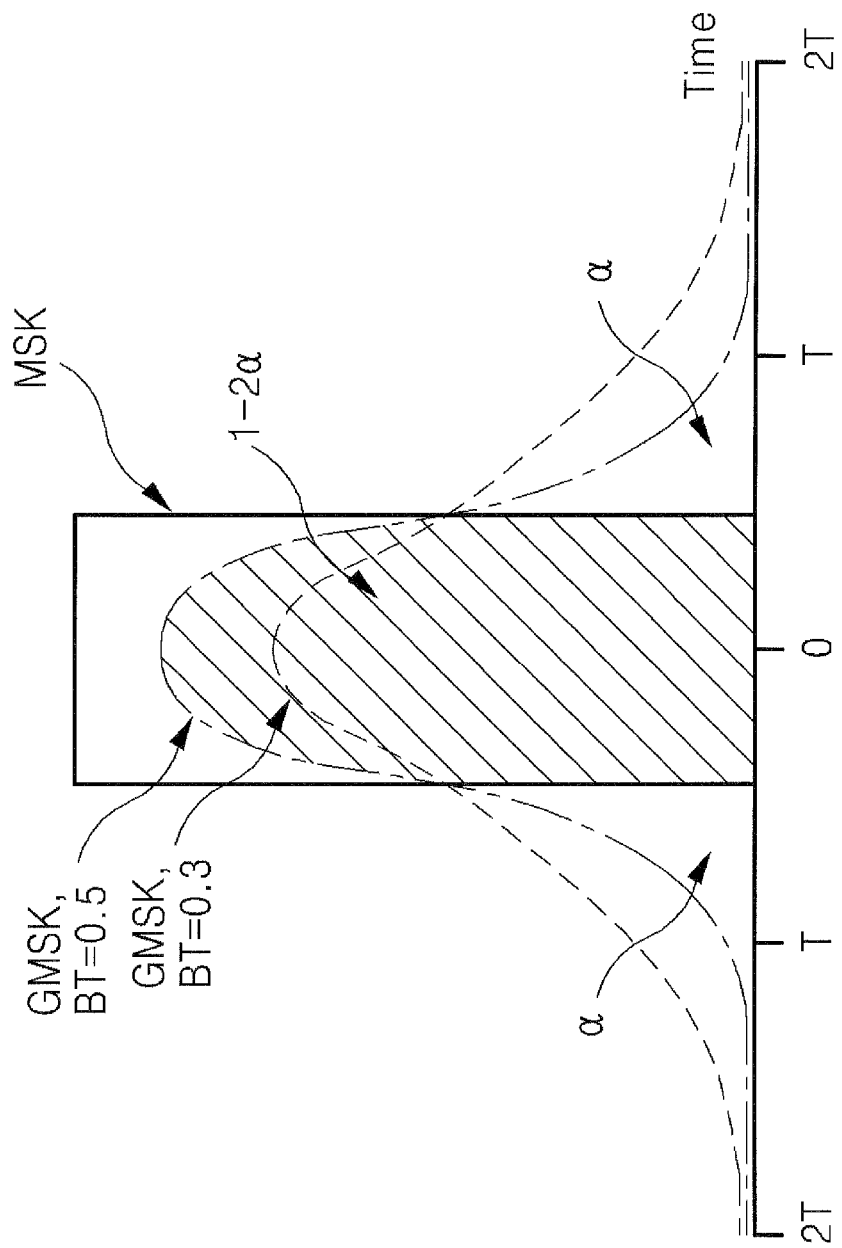
FIG. 1 illustrates the impulse response of a Gaussian pulse shaping filter with respect to bandwidth (BT)
Figure 2:
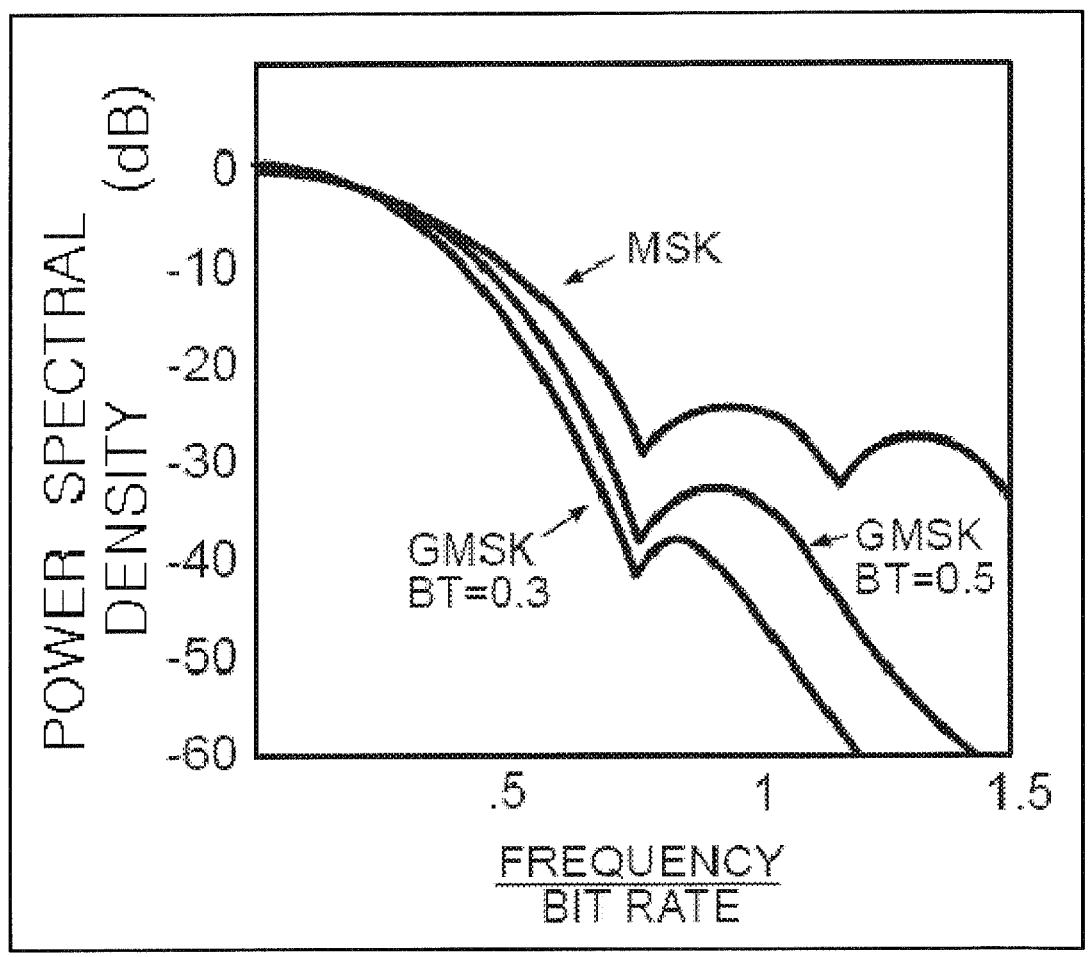
FIG. 2 illustrates the power spectral density (PSD) of minimum shift keying (MSK) and Gaussian minimum shift keying (GMSK)
Figure 3:
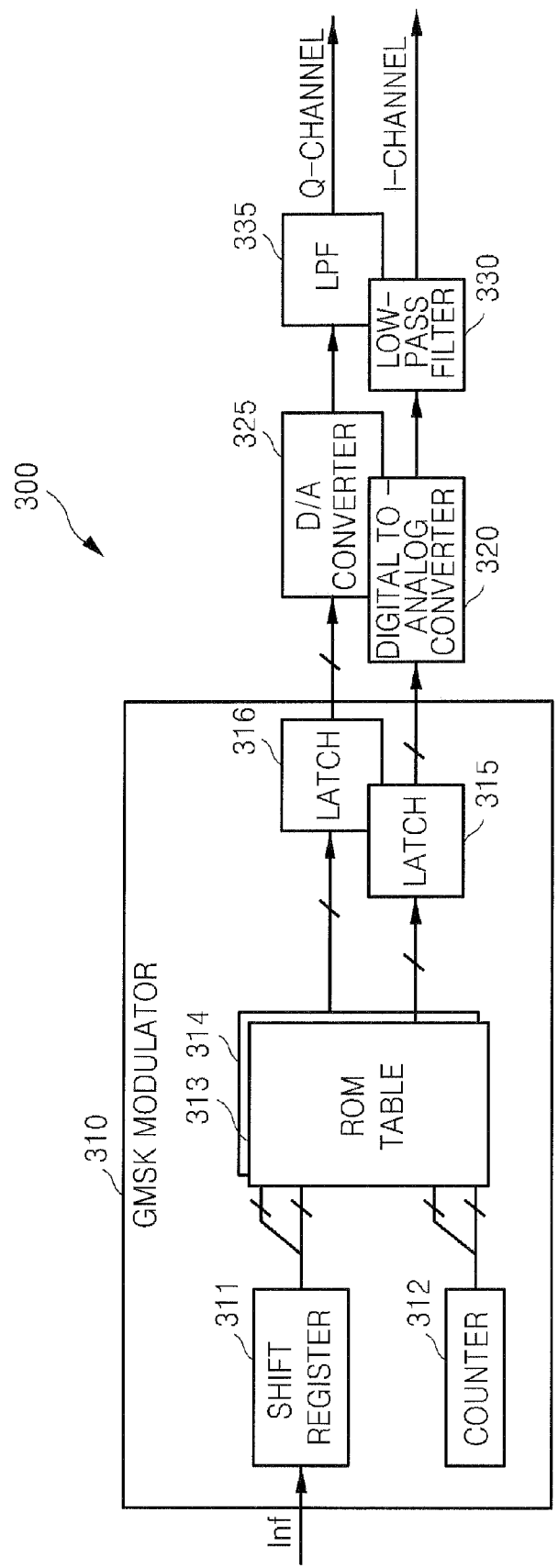
FIG. 3 is a block diagram of a conventional data modulator for performing GMSK modulation.

The attached drawings for illustrating exemplary embodiments of the present invention are referred to in order to gain a sufficient understanding of the present invention, the merits thereof, and the objectives accomplished by the implementation of exemplary embodiments of the present invention.

Hereinafter, the present invention will be described in detail by explaining exemplary embodiments with reference to the attached drawings. Like reference numerals in the drawings denote like elements.

Figure 4:
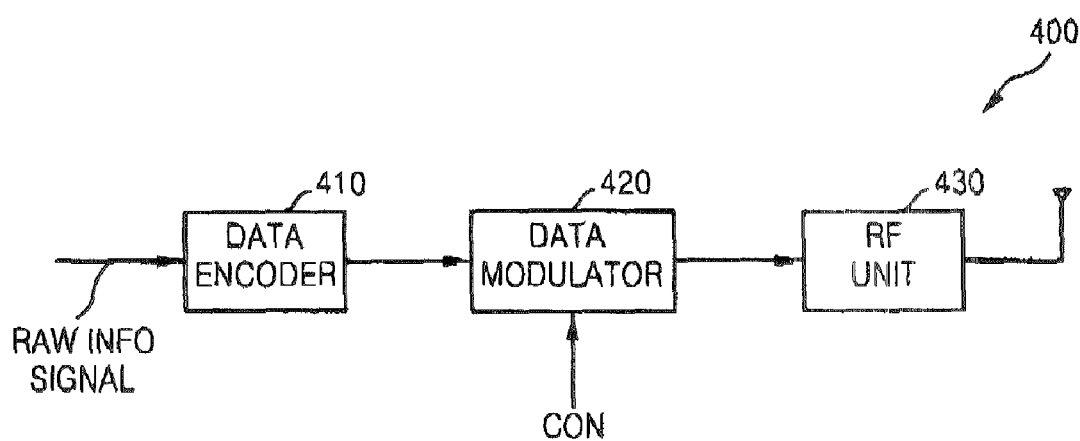
FIG. 4 is a block diagram of a data transmitter based on GMSK modulation according to an exemplary embodiment of the present invention.

FIG. 4 is a block diagram of a data transmitter 400 based on Gaussian minimum shift keying (GMSK) modulation according to an exemplary embodiment of the present invention. The data transmitter 400 includes a data encoder 410, a data modulator 420, and a radio frequency (RF) unit 430.

The data encoder 410 codes a raw information signal input thereto and outputs a digital information signal.

The data modulator 420 modulates the digital information signal output from the data encoder 410 into a first GMSK modulation signal, selects one modulation signal from among the first GMSK modulation signal and a second GMSK modulation signal by filtering the first GMSK modulation signal based on a predetermined control signal CON including information about a channel state, which is input from a receiver (not shown) and fed to the data modulator 420, and converts the selected modulation signal into an analog signal.

The RF unit 430 upconverts the analog signal output from the data modulator 420 to a signal in the carrier frequency band.

Figure 5:
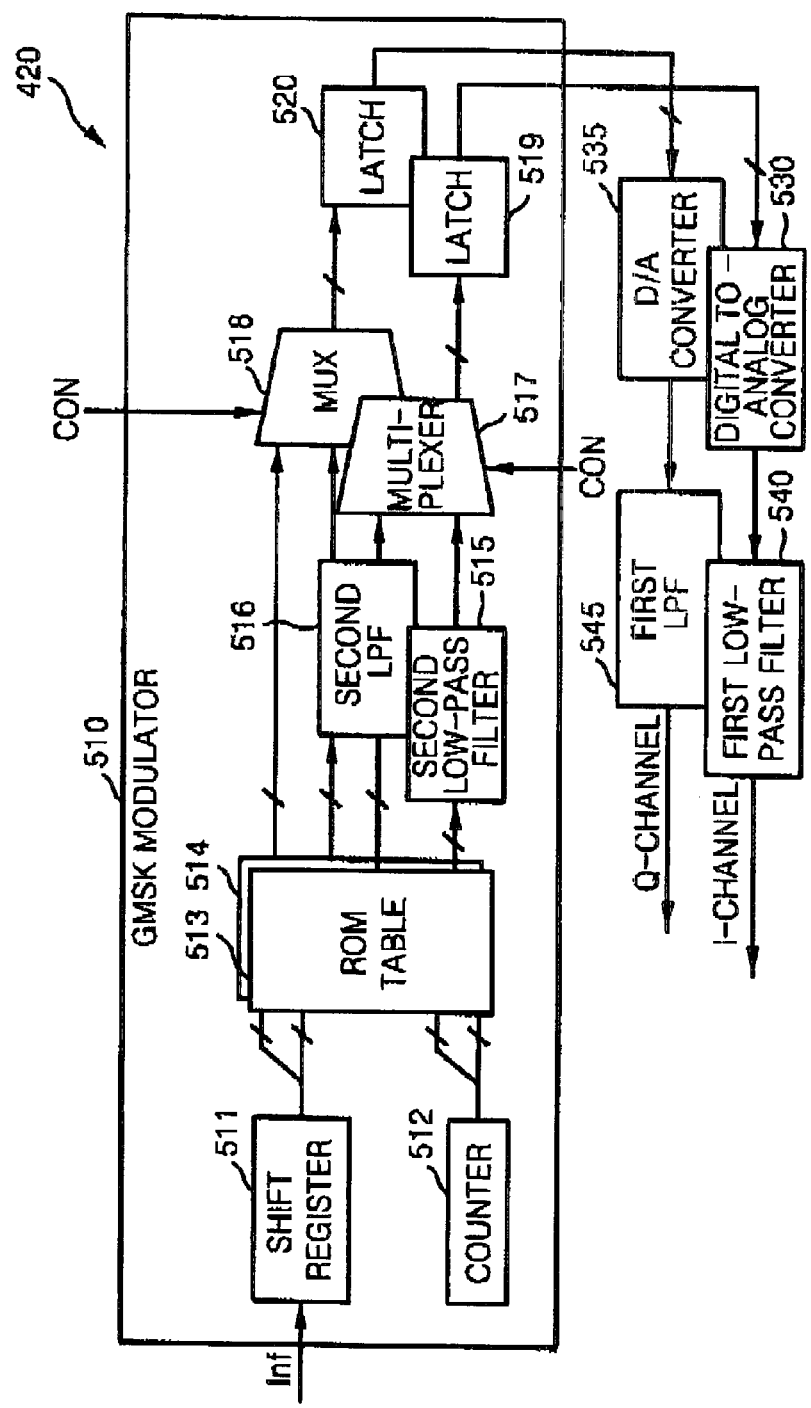
FIG. 5 is a block diagram of a data modulator based on GMSK modulation according to an exemplary embodiment of the present invention.

FIG. 5 is a block diagram of the data modulator 420 based on GMSK modulation according to an exemplary embodiment of the present invention. Referring to FIG. 5, the data modulator 420 includes a GMSK modulator 510, digital-to-analog converters 530 and 535, and first low-pass filters 540 and 545 for the I and Q channels, respectively.

The GMSK modulator 510 includes a shift register 511, a counter 512, an I-channel read-only memory (ROM) table shown at 513, a Q-channel ROM table shown at 514, second low-pass filters 515 and 516, multiplexers 517 and 518, and latches 519 and 520.

The shifter register 511 shifts a digital information signal Inf, which is input in a bitstream, and outputs a first data signal, which is one among N-bit data signals. N is determined based on a trade-off between the modulation accuracy of the GMSK modulator 510 and the ROM table (513, 514) size. In an exemplary embodiment of the present invention, each of the N-bit data signals comprises N bits, so the first data signal also comprises N bits.

The I-channel ROM table 513 and the Q-channel ROM table 514 store GMSK modulation signals corresponding to the respective N-bit data signals with respect to and I-channel and a Q-channel, respectively. Each of the I-channel ROM table 513 and the Q-channel ROM table 514 outputs a first GMSK modulation signal, which is one GMSK modulation signals corresponding to the first data signal from among the stored GMSK modulation signals. The GMSK modulation signals may include a plurality of samples.

The counter 512 outputs a count signal for sequentially outputting the plurality of samples to the I-channel ROM table 513 and the Q-channel ROM table 514.

The second low-pass filter 515 filters the first GMSK modulations signal for the I-channel, which is output form the I-channel ROM table 513, and outputs a second GMSK modulation signal for the I-channel. The other second low-pass filter 516 filters the first GMSK modulation signal for the Q-channel, which is output from the Q-channel ROM table 514, and outputs a second GMSK modulation signal for the Q-channel. Each of the second low-pass filters 515 and 516 may be a finite impulse response (FIR) filter having a linear phase characteristic. In addition, each of the second low-pass filters 515 and 516 may be implemented by a digital signal processor (DSP) having a memory, so that the filter coefficients can be changed when hardware is set.

The multiplexer 517 selects and outputs one signal from among the first GMSK modulation signal for the I-channel and the second GMSK modulation signal output from the second low-pass filter 515 based on the predetermined control signal CON. The multiplexer 518 selects and outputs one signal from among the first GMSK modulation signal for the Q-channel and the second GMSK modulation signal output from the second low-pass filter 516 based on the predetermined control signal CON.

The predetermined control signal CON may be determined based on channel state information including adjacent channel interference (ACI) and inter-symbol interference (ISI), which may be received from a receiver. For example, a receiver may determine a channel state based on data received from a data transmitter and transmit information on the channel state to the data transmitter 400. Then the data transmitter 400 receives the channel state information and may determine the control signal CON based on the received channel state information.

In the current embodiment, the GMSK modulator 510 outputs the first GMSK modulation signal output from each of the I-channel ROM table 513 and the Q-channel ROM table 514 or outputs the second GMSK modulation signal output from each of the second low-pass filters 515 and 516, which perform filtering with a predetermined filter coefficient, based on the channel state. The filter coefficient of the second low-pass filters 515 and 516 may be changed through programming during hardware setting and may be changed based on the channel state information. When the control signal CON determined based on a channel state having seriously high ACI is input to the multiplexers 517 and 518, each of the multiplexers 517 and 518 may output the second GMSK modulation signal having a narrower bandwidth than the first GMSK modulation signal.

The latch 519 latches the first or second GMSK modulation signal corresponding to the I-channel, which is output from the multiplexer 517. The latch 520 latches the first or second GMSK modulation signal corresponding to the Q-channel, which is output from the multiplexer 518.

The digital-to-analog converter 530 converts a digital modulation signal output from the latch 519 into an analog signal and the first low-pass filter 540 outputs the analog signal to the I-channel. The digital-to-analog converter 535 converts a digital modulation signal output from the latch 520 into an analog signal and the first low-pass filter 545 outputs the analog signal to the Q-channel.

The GMSK modulator 510 illustrated in FIG. 5 includes the two second low-pass filters 515 and 516 and the two multiplexers 517 and 518 individually for the I-channel and the Q-channel, respectively. The present invention, however, is not restricted to this exemplary embodiment, for example, a common low-pass filter and a common multiplexer may be implemented for both the I-channel and the Q-channel.

Figure 6:
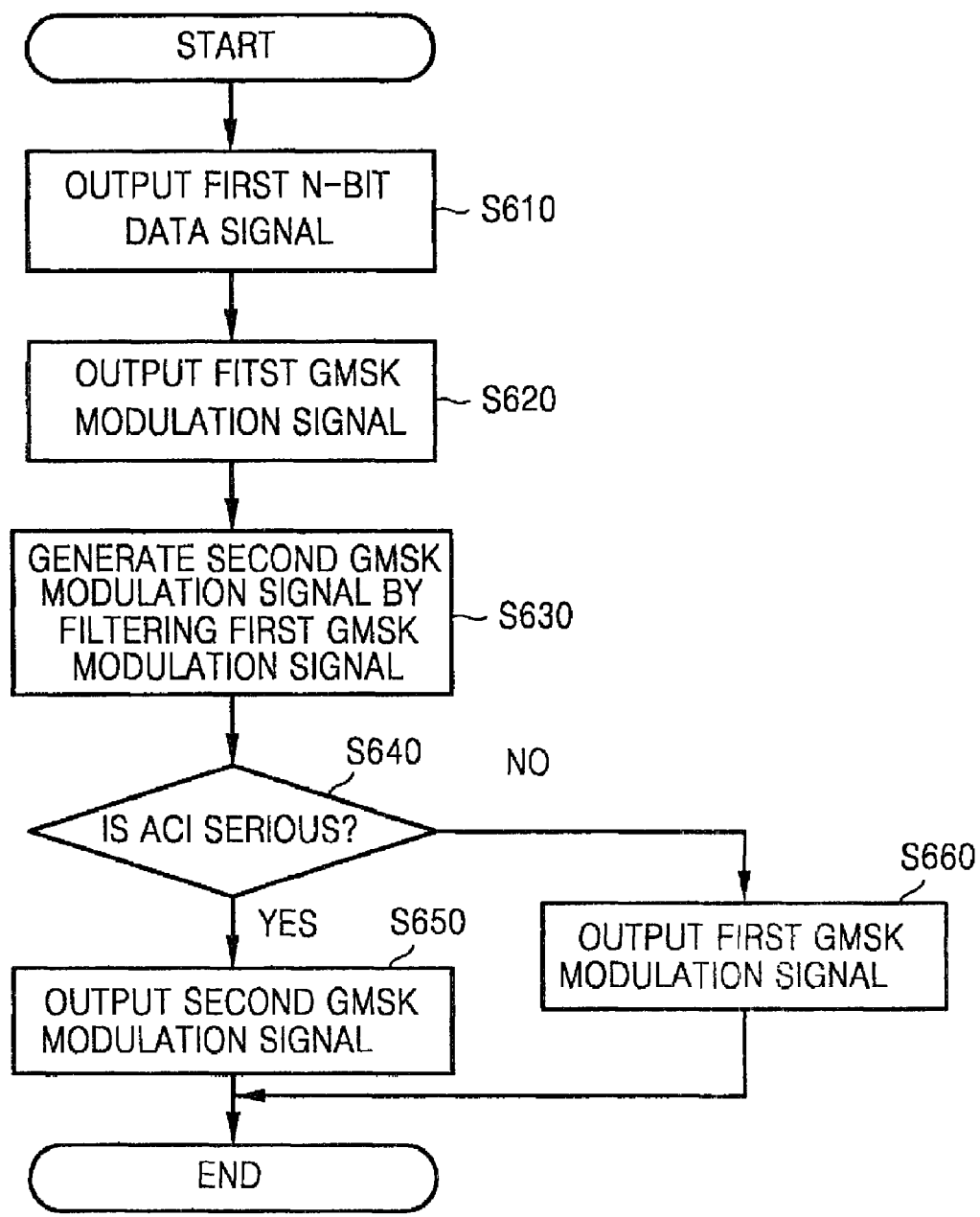
FIG. 6 is a flowchart of a data modulation procedure based on GMSK modulation according to an exemplary embodiment of the present invention.

FIG. 6 is a flowchart of a data modulation procedure based on GMSK modulation according to an exemplary embodiment of the present invention. The data modulation procedure is performed by the data modulator 420 illustrated in FIG. 5.

Referring to FIGS. 5 and 6, in operation S610 the digital information signal Inf, which is input in a bitstream, is shifted by the shift register 511 and a first data signal corresponding to one of N-bit data signals is output.

In operation S620, a first GMSK modulation signal corresponding to the first data signal is output from the I-channel ROM table 513 and a first GMSK modulation signal corresponding to the first data signal is output from the Q-channel ROM table 514.

In operation S630, the first GMSK modulation signal output from the I-channel ROM table 513 is filtered by the second low-pass filter 515, and a second GMSK modulation signal is generated while the first GMSK modulation signal output from the Q-channel ROM table 514 is filtered by the second low-pass filter 516, and a second GMSK modulation signal is generated.

The control signal CON generated based on channel state information includes ACI information. Accordingly, in operation S640 the seriousness of the ACI is determined based on the control signal CON.

When it is determined that the ACI is seriously high, the second GMSK modulation signal is output from each of the multiplexers 517 and 518 based on the control signal CON in operation S650.

When it is determined that the ACI is not serious, the first GMSK modulation signal is output from each of the multiplexers 517 and 518 based on the control signal CON in operation S660.

As described above, according to an exemplary embodiment of the present invention, a GMSK modulation signal, which is output based on a fixed BT value, that is, data having a fixed number of bits, is filtered based on channel state information. As a result, even in a state where the number of bits of data used for GMSK modulation is fixed, the trade-off between ACI and ISI can be effectively controlled according to a channel state.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data modulator comprising:
a shift register shifting a digital information signal, which is input in a bitstream, and outputting a first data signal, which is one of N-bit data signals;
a read-only memory (ROM) table storing Gaussian minimum shift keying (GMSK) modulation signals respectively corresponding to the N-bit data signals and outputting a first GMSK modulation signal, which is one GMSK modulation signal corresponding to the first data signal from among the stored GMSK modulation signals;
a low-pass filter filtering the first GMSK modulation signal and outputting a second GMSK modulation signal; and
a multiplexer selecting and outputting one signal from among the first GMSK modulation signal and the second GMSK modulation signal based on a predetermined control signal.

2. The data modulator of claim 1, further comprising a counter outputting a count signal for sequentially outputting M samples in the first GMSK modulation signal corresponding to the first data signal, wherein each of the GMSK modulation signals comprises M samples.

3. The data modulator of claim 1, wherein the ROM table, the low-pass filter, and the multiplexer are provided for each of an I-channel and a Q-channel.

4. The data modulator of claim 1, wherein the predetermined control signal is determined based on channel state information including adjacent channel interference and inter-symbol interference, which is obtained from a receiver.

5. The data modulator of claim 1, wherein the low-pass filter is a finite impulse response (FIR) filter.

6. The data modulator of claim 1, wherein the low-pass filter has a filter coefficient that can be changed.

7. A method of modulating data based on a read-only memory (ROM) table that stores Gaussian minimum shift keying (GMSK) modulation signals respectively corresponding to N-bit data signals, the method comprising the operations of:
- shifting a digital information signal, which is input in a bitstream, and outputting a first data signal, which is one of the N-bit data signals;
- outputting a first GMSK modulation signal, which is one GMSK modulation signal corresponding to the first data signal from among the stored GMSK modulation signals, from the ROM table;
- filtering the first GMSK modulation signal to output a second GMSK modulation signal; and
- selecting and outputting one signal from among the first GMSK modulation signal and the second GMSK modulation signal based on a predetermined control signal.

8. The method of claim 7, wherein the predetermined control signal is an index indicating channel state information including adjacent channel interference that is received from a predetermined receiver.

9. The method of claim 7, wherein the operation of filtering the first GMSK modulation signal is performed by a low-pass finite impulse response (FIR) filter.

10. A data transmitter comprising:
- a data encoder encoding an analog information signal into a digital information signal;
- a data modulator modulating the digital information signal into a first Gaussian minimum shift keying (GMSK) modulation signal and selecting and outputting one modulation signal from among the first GMSK signal and a second GMSK signal, which is obtained by filtering the first GMSK modulation signal, based on a predetermined control signal including channel state information received from a receiver; and
- a digital-to-analog converter converting a modulation signal output from the data modulator into an analog signal.

11. The data transmitter of claim 10, wherein the data modulator comprises:
- a read-only memory (ROM) table storing Gaussian minimum shift keying (GMSK) modulation signals respectively corresponding to all N-bit data signals;
- a shift register shifting a digital information signal, which is input in a bitstream, and outputting a first data signal, which is one of the N-bit data signals;
- a low-pass filter filtering a first GMSK modulation signal, which is one GMSK modulation signal corresponding to the first data signal from among the stored GMSK modulation signals and is output from the ROM table, and outputting a second GMSK modulation signal; and
- a multiplexer selecting and outputting one signal among the first GMSK modulation signal and the second GMSK modulation signal based on a predetermined control signal.

* * * * *